United States Patent [19]

Borglum

[11] Patent Number: 5,993,985
[45] Date of Patent: Nov. 30, 1999

[54] FUEL CELL TUBES AND METHOD OF MAKING SAME

[75] Inventor: Brian P. Borglum, Edgewood, Pa.

[73] Assignee: Siemens Westinghouse Power Corporation, Orlando, Fla.

[21] Appl. No.: 09/058,067

[22] Filed: Apr. 9, 1998

[51] Int. Cl.⁶ .................................................. H01M 8/10
[52] U.S. Cl. ................................. 429/31; 429/33; 429/34; 429/35; 429/39; 264/433; 264/435; 264/605; 264/618; 264/628; 264/632; 264/634; 264/635; 264/638; 264/645
[58] Field of Search ................................. 429/31, 30, 33, 429/34, 35, 39; 204/421; 264/605, 618, 628, 629, 632, 634, 635, 638, 645, 433, 434

[56] References Cited

U.S. PATENT DOCUMENTS

| | | |
|---|---|---|
| 4,395,468 | 7/1983 | Isenberg . |
| 4,414,337 | 11/1983 | Ichikawa et al. . |
| 4,431,715 | 2/1984 | Isenberg . |
| 4,490,444 | 12/1984 | Isenberg . |
| 4,562,124 | 12/1985 | Ruka . |
| 4,631,238 | 12/1986 | Ruka . |
| 4,748,091 | 5/1988 | Isenberg . |
| 4,751,152 | 6/1988 | Zymboly . |
| 4,791,035 | 12/1988 | Reichner . |
| 4,833,045 | 5/1989 | Pollack et al. . |
| 4,874,678 | 10/1989 | Reichner . |
| 4,876,163 | 10/1989 | Reichner . |
| 4,888,254 | 12/1989 | Reichner . |
| 5,043,116 | 8/1991 | Oshima et al. ......................... 264/634 |
| 5,064,588 | 11/1991 | Misawa . |
| 5,103,871 | 4/1992 | Misawa et al. . |
| 5,108,850 | 4/1992 | Carlson et al. . |
| 5,112,544 | 5/1992 | Misawa et al. . |
| 5,176,967 | 1/1993 | Ishihara et al. ............................ 429/31 |
| 5,227,102 | 7/1993 | Yamada .................................... 264/628 |
| 5,258,240 | 11/1993 | Di Croce et al. . |
| 5,273,838 | 12/1993 | Draper et al. . |
| 5,336,569 | 8/1994 | Misawa et al. ............................ 429/31 |
| 5,514,313 | 5/1996 | Yoshida . |
| 5,529,651 | 6/1996 | Yoshida et al. . |

*Primary Examiner*—Bruce F. Bell
*Attorney, Agent, or Firm*—Eckert Seaman Cherin & Mellottt, LLC

[57] ABSTRACT

A method of manufacturing porous ceramic tubes for fuel cells with improved properties and higher manufacturing yield is disclosed. The method involves extruding a closed end fuel cell tube, such as an air electrode of a solid oxide fuel cell, in which the closed end also functions as the sintering support. The resultant fuel cell tube has a superior porosity distribution which allows improved diffusion of oxygen at the closed end of the tube during operation of the fuel cell. Because this region has the highest current density, performance enhancement and improved reliability of the fuel cell tube result. Furthermore, the higher manufacturing yield associated with the present method decreases the overall fuel cell cost.

20 Claims, 4 Drawing Sheets

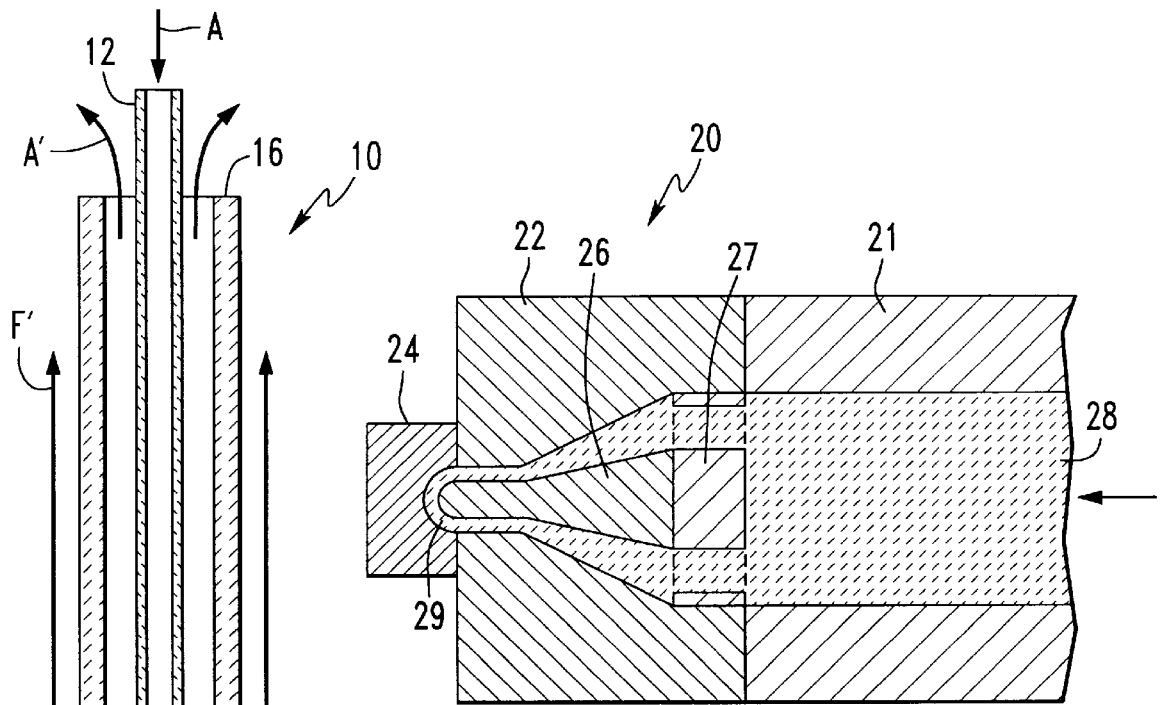
FIG. 1
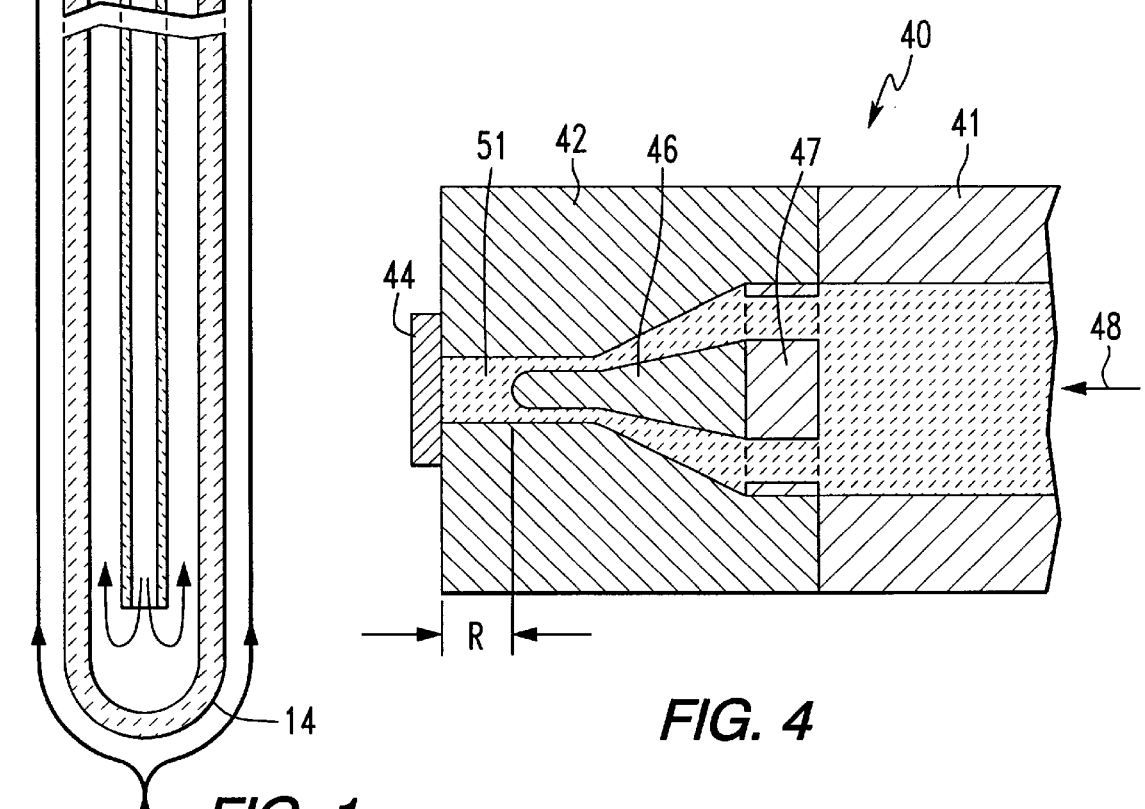
FIG. 2
PRIOR ART
FIG. 4

FUEL CELL TUBES AND METHOD OF MAKING SAME

GOVERNMENT CONTRACT

The Government of the United States of America has certain rights in this invention pursuant to Contract No. DE-FC21-91MC28055 awarded by the U.S. Department of Energy.

FIELD OF THE INVENTION

The present invention relates to fuel cells, and more particularly relates to tubular components such as air electrodes for solid oxide fuel cells and a method of making such tubular components.

BACKGROUND INFORMATION

Fuel cells are among the most efficient of power generation devices. One type of solid oxide fuel cell (SOFC) generator has a projected 70 percent net efficiency when used in an integrated SOFC-combustion turbine power system in which the turbine combustor is replaced by a SOFC.

Several different fuel cell designs are known. For example, one type of solid oxide fuel cell consists of an inner porous doped-lanthanum manganite tube having an open end and a closed end, which serves as the support structure for the individual cell, and is also the cathode or air electrode (AE) of the cell. A thin gas-tight yttria-stabilized zirconia electrolyte covers the air electrode except for a relatively thin strip of an interconnection surface, which is a dense gas-tight layer of doped-lanthanum chromite. This strip serves as the electric contacting area to an adjacent cell or, alternatively, to a power contact. A porous nickel-zirconia cermet layer, which is the anode or fuel electrode, covers the electrolyte, but not the interconnection strip. A typical closed end SOFC air electrode tube has a length of about 1.81 m, a diameter of about 2.2 cm and is used in a seal-less SOFC design.

Exemplary fuel cells are disclosed in U.S. Pat. Nos. 4,431,715 to Isenberg, 4,395,468 to Isenberg, 4,490,444 to Isenberg, 4,562,124 to Ruka, 4,631,138 to Ruka, 4,748,091 to Isenberg, 4,751,152 to Zymboly, 4,791,035 to Reichner, 4,833,045 to Pollack, et al., 4,874,678 to Reichner, 4,876,163 to Reichner, 4,888,254 to Reichner, 5,103,871 to Misawa et al., 5,108,850 to Carlson et al., 5,112,544 to Misawa et al., 5,258,240 to Di Croce et al., and 5,273,828 to Draper et al., each of which is incorporated herein by reference.

SUMMARY OF THE INVENTION

The present invention provides a method in which a closed end fuel cell tube, such as a SOFC air electrode tube, is densified in a manner that results in a porosity distribution that varies along the length of the tube, with the closed end having higher porosity than the open end. Such a porosity distribution places the portion of the fuel cell tube with the highest oxygen diffusivity in the region of the SOFC with the highest current density, thus minimizing diffusion polarizations and enhancing SOFC performance. The fuel cell tube preferably has a vertical orientation during sintering, and is supported while hanging from its closed end. An extended closed end is preferably formed by extrusion and functions as the hanging support for the air electrode.

The cross-sectional geometry of the fuel cell tube may be round, square or any other suitable geometric configuration. The fuel cell tube may optionally include at least one integral rib. After sintering and machining the closed end of the fuel cell tube may be flat, hemispherical or any other suitable geometric configuration. As used herein, the term "fuel cell" includes SOFCs, oxygen/hydrogen generator type solid oxide electrolyte electrochemical cells, solid oxide electrolyte cells, oxygen sensors and the like.

An object of the present invention is to provide an improved porous ceramic closed end fuel cell tube having higher porosity at the closed end of the tube than at the open end of the tube.

Another object of the present invention is to provide a fuel cell tube including a closed end having an extended support portion from which the tube can be suspended during sintering operations.

Another object of the present invention is to provide a method of making a ceramic fuel cell tube.

These and other objects of the present invention will be more apparent from the following description.

BRIEF DESCRIPTION OF THE DRAWINGS

FIG. 1 is a partially schematic sectional view of a tubular solid oxide fuel cell showing air and fuel flow paths during operation of the cell.

FIG. 2 is a partially schematic sectional view of a conventional die set for making a closed end tubular air electrode.

FIG. 4 is a partially schematic sectional view of a die set used in accordance with an embodiment of the present invention to form air electrode tubes that can be suspended from their closed ends during subsequent sintering operations.

DETAILED DESCRIPTION OF THE PREFERRED EMBODIMENT

Figure 3:
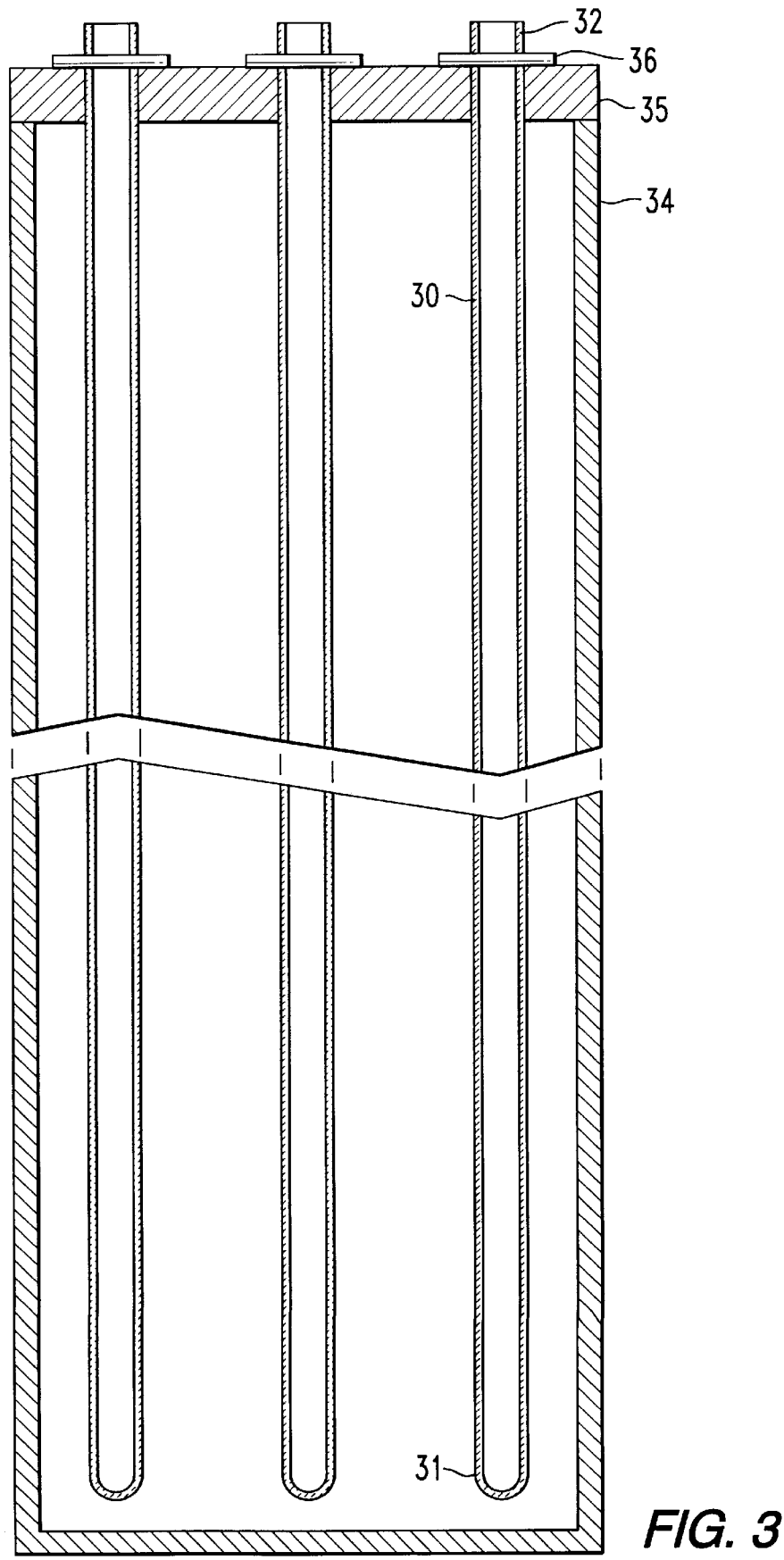
FIG. 3 is a partially schematic side view showing a conventional air electrode tube sintering operation in which the tubes are vertically oriented with the open ends of the tubes supported by hanging pins.

A closed end SOFC tube is shown schematically in FIG. 1. Air A is introduced into the cell 10 by a ceramic injector tube 12 that delivers air to the closed end 14 of the cell. The closed end 14 of the cell 10 provides an integral air return, allowing air to flow the entire length of the cell from the closed end 14 to the open end 16. The open end 16 of the cell passes through a fibrous refractory insulation board (not shown). Fuel F is introduced to the external side of the cell 10 at the cell closed end 14, flows axially along the external surface toward the open end 16, and is electrochemically consumed along its path. At the point that the fuel F' approaches the cell open end 16, about 85 percent of the fuel F' has typically been electrochemically oxidized. At the cell open end 16, the spent fuel F' passes through the refractory board (not shown) where it combines with the oxygen-depleted air A' and combusts. The interface at the cell opening 16 preferably comprises a controlled leakage seal of known design. This seal, coupled with the integral air return manifold comprising the air injector tube 12 and the closed end 14 of the cell 10, result in a stack design with no requirement for absolute or high integrity seals between fuel and air.

The fuel cell 10 may be of any known composition. For example, the fuel cell may comprise an inner porous doped-lanthanum manganite tube having an open end and a closed end, which serves as the support structure for the individual cell, and is also the cathode or air electrode of the cell. A thin gas-tight yttria-stabilized zirconia electrolyte may cover the air electrode except for a relatively thin strip of an interconnection surface, which may be a dense gas-tight layer of doped-lanthanum chromite. This strip serves as the electric contacting area to an adjacent cell or, alternatively, to a power contact. A porous nickel-zirconia cermet layer, which is the anode or fuel electrode, may cover the electrolyte, but not the interconnection strip.

The lower or closed end 14 of the cell 10 shown in FIG. 1 experiences conditions that are unique when compared to the rest of the cell. In particular, this region operates under the highest local current density. This results from the introduction of the fuel F at the closed end 14. The local current density decreases approaching the open end 16 of the cell 10. When the cell 10 is operated at a high fuel utilization, this effect becomes more pronounced.

Conventional air electrode tubes are typically sintered while hanging from their open ends. This is a result of the method used to form the closed end of the air electrode tube. An illustration of a conventional closed end die set 20 is shown in FIG. 2. The die set 20 includes an extrusion cylinder 21 connected to an outer die body 22. A cap 24 is removably attached to the outer die body 22. A generally conical die pin 26 is positioned inside a generally conical opening in the outer die body 22. The die pin 26 is supported by means of a spider 27 having a central hub connected to an outer ring by multiple vanes. The spider 27 fits within the outer die body 22.

An extrusion mix 28 is forced into the die set 20 in the direction of the arrow shown in FIG. 2. The extrusion mix 28 passes through the openings in the spider 27 into the outer die body 22. As the extrusion mix 28 passes over the outer surface of the die pin 26, it is constricted into a cylindrical tube shape having a closed end 29. The inside surface of the closed end conforms with the tip of the die pin 26, while the outside surface of the closed end conforms with a hemispherical indentation in the die cap 24. After the extrusion mix 28 fills the outer die body 22 and die cap 24 as shown in FIG. 2, the die cap 24 is removed, and further extrusion of the die mix 28 results in the formation of the closed end 29 cylindrical tube. In this manner, the closed end of the extruded tube is formed to net shape, with only minor grinding required to provide a relatively smooth closed end outer surface of the tube.

Air electrode tubes produced with a die as shown in FIG. 2 must be supported from their open ends. Additionally, a separate tube reinforcement procedure is necessary in order to increase the cross-sectional area of the air electrode tube to prevent it from failing during sintering.

As shown in FIG. 3, air electrode tubes are conventionally vertically sintered in order to produce straight tubes. An extruded air electrode tube 30 having a closed end 31 and an open end 32 is suspended in a ceramic muffle tube 34 having a ceramic cover 35 by means of a pin 36 made of alumina or the like. This assembly resides within a conventional furnace (not shown). The air electrode tube 30 is suspended from its open end 32 during the sintering process. However, vertical sintering as shown in FIG. 3 gives rise to a variation in density along the length of the air electrode tube 30. As the air electrode tube 30 sinters, the region of greatest tension in the tube is located immediately below the hanging pin 36. This tensile force reduces the sintering rate locally and, combined with high temperature creep, gives rise to a lower local density. Conversely, the lower end 31 of the tube 30 does not experience any severe external forces and sinters to a higher density. Therefore, the closed end portions of these air electrodes are more dense than the open ends.

In SOFC's, the transport of oxygen through the porous fuel cell air electrode is critical for the overall performance of the SOFC. The transport of oxygen may be quantified by measuring the oxygen diffusivity of the material. Air electrode diffusivity and porosity are directly related to each other. As a result, air electrode porosity is an important parameter to control during the tube manufacturing process.

High current density operation requires more oxygen to be supplied from the inner air side of the cell to the electrolyte/air electrode interface for the electrochemical oxidation of fuel. Under conditions of high current density, and hence high oxygen utilization, the diffusion of oxygen may become the rate-limiting step in the electrochemical reactions of the SOFC. Cells that are operated at high currents with low porosity (low diffusivity) air electrodes have been known to fracture as a result of extraction of oxygen from the doped $LaMnO_3$ air electrode. This type of failure results in direct combustion of air and fuel, a subsequent hot spot in a SOFC generator, and necessitates a generator shut down to correct the problem. As a result, this condition should be avoided.

It would be beneficial from a cell operation and performance point of view to have the more porous region of the air electrode tube at the closed end of the cell, as long as it did not compromise the physical integrity of the cell. This would place the highest diffusivity portion of the cell in the region with the highest current density.

The method of the present invention allows an extruded closed end ceramic tube to be sintered while hanging from its closed end using a unique die configuration. FIG. 4 schematically illustrates a die set 40 in accordance with an embodiment of the present invention. The die set 40 includes an extrusion cylinder 41 connected to an outer die body 42. A cap 44 is removably attached to the outer die body 42. A generally conical die pin 46 is positioned inside a generally conical cavity in the outer die body 42. The die pin 46 is secured to the feed tube 41 by means of a spider 47 having a central hub and multiple vanes. The spider 47 fits within the outer die body 42. In contrast with the die set 20 shown in FIG. 2, the die pin 46 shown in FIG. 4 is set back from the opening of the outer die body 42 by a recess distance R.

As the extrusion mix 48 is forced in the direction of the arrow shown in FIG. 4, the mix flows through the spider 47 and enters the cavity of the outer die body 42. The extrusion mix 48 may be composed of ceramic particles, organic binders, plasticizers, thermoplastic resins, solvents and the like, as known in the art. Due to the recess R, the extrusion mix 48 forms an integral extended portion 51 at the closed end of the extruded tube. After the extrusion mix 48 fills the die set 40 as shown in FIG. 4, the die cap 44 is removed, and further extrusion of the mix 48 results in the formation of a generally cylindrical tube including the extended portion 51 at its closed end.

Figure 5:
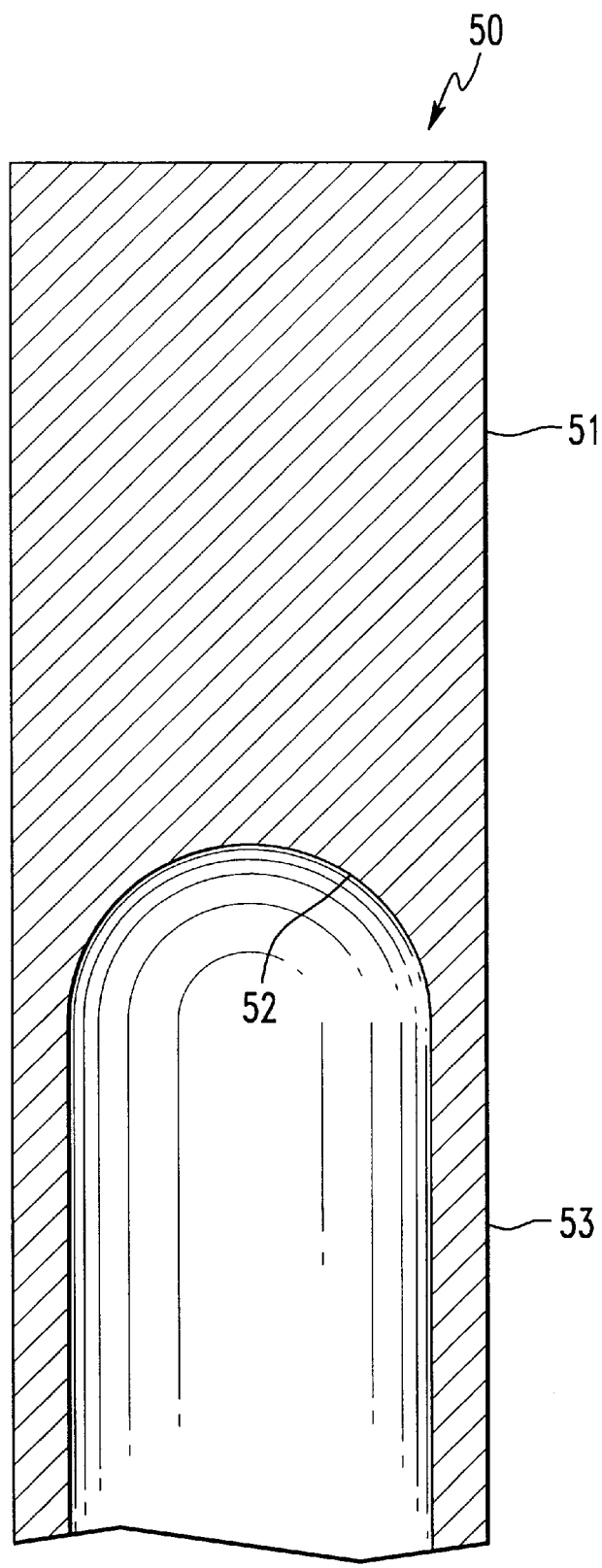
FIG. 5 is a sectional view of a closed end air electrode tube including an extended support portion from which the tube can be suspended during sintering.

FIG. 5 illustrates a closed end fuel cell tube 50 produced in accordance with an embodiment of the present invention. The fuel cell tube 50 includes an extended support portion 51 integrally formed with the closed end 52 of the tube. The fuel cell tube 50 includes a generally cylindrical sidewall 53, which may be any desired length and thickness. The fuel cell tube 50 may optionally include at least one integral rib (not shown) formed in the interior of the sidewall 53. In a preferred embodiment, the sidewall 53 has a circular cross-section with an outer diameter substantially equal to the outer diameter of the extended portion 51. However, the sidewall 53 and extended portion 51 may have any other suitable cross-sectional geometry. For example, the sidewall 53 and extended portion 51 may have square, oval or flattened cross-sections, or the like. The axial length of the extended portion 51 is preferably from about 1 to about 5 times the outer diameter of the sidewall 53. The fuel cell tube 50 may be made of any desired composition such as doped-lanthanum manganite.

Figure 6:
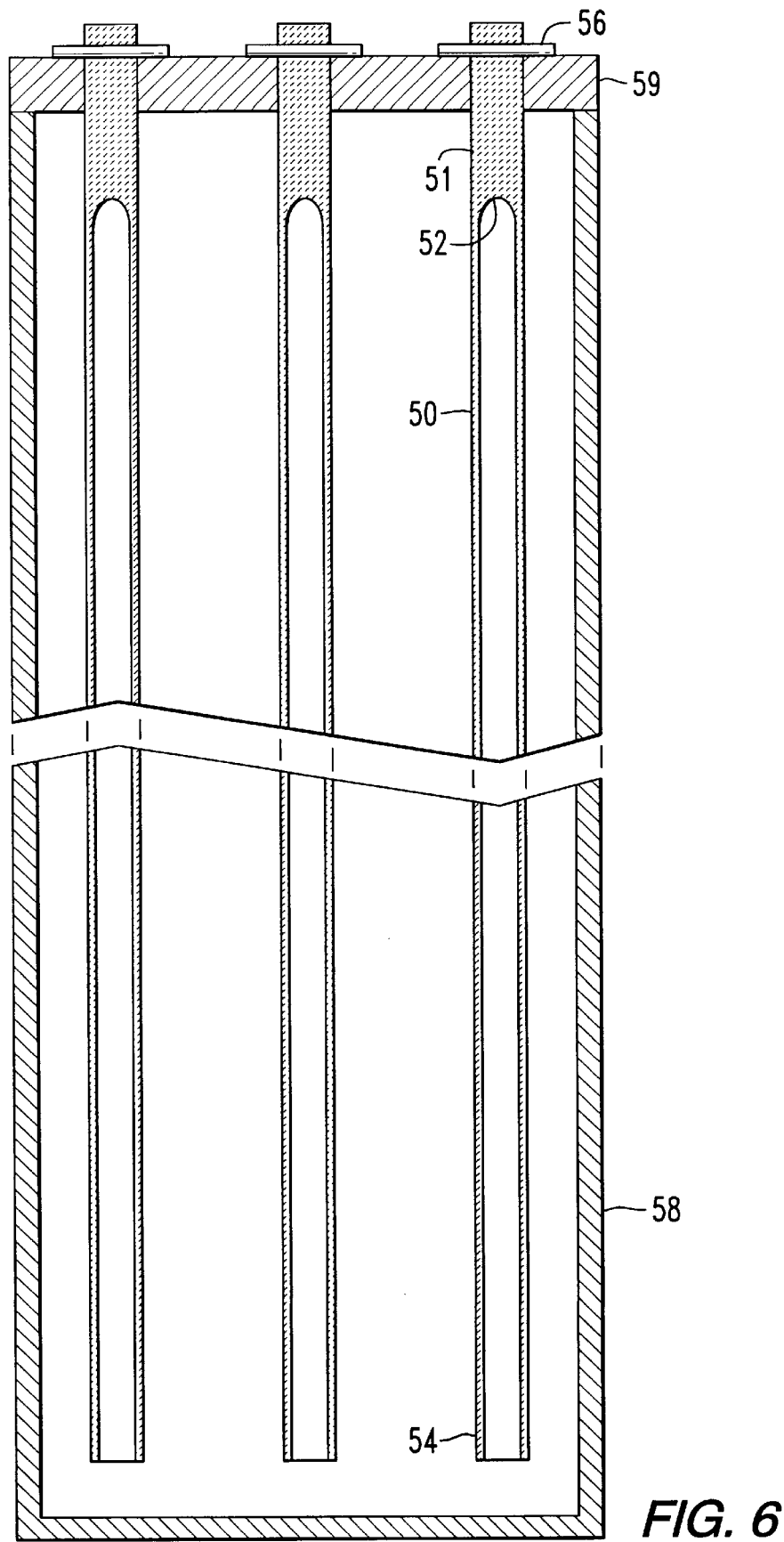
FIG. 6 is a partially schematic side view showing a sintering operation in which the closed ends of air electrode tubes are supported in accordance with an embodiment of the present invention.

Sintering of the fuel cell tube 50 is preferably conducted while hanging from the closed end of the tube, as illustrated in FIG. 6. Any suitable sintering parameters may be used. For example, sintering temperatures of from about 1,350 to about 1,650° C., and sintering times of from about 0.5 to about 10 hours may be used. The extended portion 51 of the fuel cell tube 50 is suspended by means of an alumina pin 56 or other suitable support member in a ceramic muffle tube 58 having a ceramic cover 59. This assembly resides within a conventional furnace (not shown). As shown in FIG. 6, the closed end 52 of the fuel cell tube 50 is oriented at the top of the muffle tube 58, while the open end 54 is oriented at the bottom of the muffle tube. The open end 54 of the resultant sintered air electrode tube 50 is more dense than the closed end 52. After sintering, the extended support 51 is cut off, and is preferably machined to a hemispherical radius or to any other desired shape such as a flat end.

In accordance with the present invention, the sintered fuel cell tube preferably has an average porosity of from about 20 to about 40 percent. The fuel cell tube preferably has a porosity gradient along its axial length, with higher porosity near the closed end of the tube and lower porosity near the open end of the tube. The porosity at the closed end is preferably at least about 1 percent higher than the porosity at the open end, more preferably at least about 5 percent higher.

As a particular example of a fuel cell air electrode in accordance with the present invention, the ceramic fuel cell powder may comprise $La_{1-x}(M1)_xMn_{1-y}(M2)_yO_3$, where: x ranges from 0 to 0.5; M1 consists of calcium, strontium, yttrium, cerium, other appropriate dopants, or combinations thereof; y ranges from 0 to 0.5; and M2 consists of nickel, chromium, zinc, cobalt, other appropriate dopants, or combinations thereof. The solvent may comprise water, propanol, butyl acetate, or butoxyethanol, with water being preferred for many applications. In addition to the ceramic fuel cell powder and solvent, the mixture may include organic binders such as methylcellulose, hydroxypropyl methylcellulose, polyvinyl alcohol, polyvinyl butyral resin or acrylic polymer, and/or may include plasticizers such as polyethylene glycol, butylbenzyl phthalate or polymeric fatty acids.

The fuel cell tube is preferably formed by extrusion. For example, a paste is made by combining an appropriate mixture of the compounds given above and mixing them under conditions of high shear. The tube may then be extruded by forcing the paste through a die as shown in FIG. 4 at elevated pressure (e.g., 800 to 5,000 psi). The shape of the die determines the cross-sectional geometry of the extruded tube. Tubes are preferably extruded from 100 to 200 cm in length and 2.2 cm in diameter, with an extended closed end that is approximately 3 to 8 cm in axial length. When a 200 cm length air electrode is fired while hanging from such a closed end, the closed end porosity and oxygen diffusivity are higher than the open end, as shown in Table 1.

TABLE 1

|  | Porosity (%) | Oxygen Diffusivity ($cm^2$/sec) |
| --- | --- | --- |
| Closed End | 33.2 | 0.022 |
| Open End | 30.6 | 0.018 |

The improved closed end oxygen diffusivity decreases the diffusion polarization of a solid oxide fuel cell operating under conditions of high fuel utilization. Electrical performance is thereby increased, resulting in greater power at a given current.

The present invention has several advantages over the prior art. The present process provides an air electrode in which the more porous (higher oxygen diffusivity) region of the tube is at the closed end of the cell. Because this is the region with the highest current density, performance is enhanced and oxygen will not be as likely to be extracted from the air electrode, thereby reducing the tendency of the cells to break. The present method also allows a closed end tube with a hanging fixture to be made in a single operation. This is in contrast with previous methods that require a sintering reinforcement to be manually installed into the open end of an air electrode tube. The elimination of conventional processing steps translates into decreased manpower requirements and the ability to automate the process, which is very important in high volume air electrode manufacturing facilities.

The extruded closed end configuration of the present invention is particularly suited for automated manufacturing processes. For example, an automated process may utilize an airfoil transport system to support the extruded tube on a bed of warm air, convey the tube through a drying chamber, drill a hole in the extended support that will accommodate a pin for hanging, and transport the tube to a sintering furnace.

Whereas particular embodiments of this invention have been described above for purposes of illustration, it will be evident to those skilled in the art that numerous variations of the details of the present invention may be made without departing from the invention as defined in the appended claims.

What is claimed is:

1. A porous ceramic fuel cell tube comprising a tubular sidewall extending from a closed end of the tube to an open end of the tube, wherein the tubular sidewall has a porosity at the closed end of the tube that is higher than a porosity at the open end of the tube.

2. The porous ceramic fuel cell tube of claim 1, wherein the porosity at the closed end of the tube is at least about 1 percent greater than the porosity at the open end of the tube.

3. The porous ceramic fuel cell tube of claim 1, wherein the porosity at the closed end of the tube is at least about 5 percent greater than the porosity at the open end of the tube.

4. The porous ceramic fuel cell tube of claim 1, wherein the tube comprises an air electrode of a solid oxide fuel cell.

5. The porous ceramic fuel cell tube of claim 4, wherein the air electrode comprises doped-lanthanum manganite.

6. A fuel cell tube comprising a tubular sidewall extending from a closed end of the tube to an open end of the tube, wherein the closed end of the tube includes an extended support portion from which the fuel cell tube can be suspended.

7. The fuel cell tube of claim 6, wherein the extended support portion comprises means for suspending the fuel cell tube in a substantially vertical orientation with the closed end of the tube above the open end of the tube.

8. The fuel cell tube of claim 6, wherein the extended support portion has an axial length of from about 1 to about 5 times an outer diameter of the tubular sidewall.

9. The fuel cell tube of claim 6, wherein the tubular sidewall has a substantially circular cross section.

10. The fuel cell tube of claim 9, wherein the extended support portion has a substantially circular cross section.

11. The fuel cell tube of claim 10, wherein the tubular sidewall and the extended support portion have outside diameters that are substantially equal.

12. The fuel cell tube of claim 6, wherein the fuel cell tube is unfired.

13. The fuel cell tube of claim 6, wherein the fuel cell tube is fired.

14. The fuel cell tube of claim 13, wherein the fired tube comprises an air electrode of a solid oxide fuel cell.

15. The fuel cell tube of claim 14, wherein the tubular sidewall has a porosity at the closed end of the tube that is higher than a porosity at the open end of the tube.

16. A method of making a fuel cell tube comprising:

extruding a mixture to form a closed end of the fuel cell tube comprising an extended support portion; and extruding an additional amount of the mixture to form a sidewall and an open end of the fuel cell tube.

17. The method of claim 16, further comprising suspending the fuel cell tube from the extended support portion in a substantially vertical orientation with the closed end of the tube above the open end of the tube.

18. The method of claim 17, further comprising sintering the suspended fuel cell tube.

19. The method of claim 18, further comprising removing at least part of the extended portion from the sintered fuel cell tube.

20. The method of claim 18, wherein the sintered fuel cell tube comprises a porous air electrode of a solid oxide fuel cell, and the sidewall has a porosity at the closed end of the tube that is higher than a porosity at the open end of the tube.

* * * * *